US012521200B2

(12) United States Patent
Ciraulo

(10) Patent No.: US 12,521,200 B2
(45) Date of Patent: Jan. 13, 2026

(54) SURGICAL HEADLAMP

(71) Applicant: Giovanni Ciraulo, Falmouth, ME (US)

(72) Inventor: Giovanni Ciraulo, Falmouth, ME (US)

(73) Assignee: CONTEMPORARY STRATEGIES LLC, Falmouth, ME (US)

( * ) Notice: Subject to any disclaimer, the term of this patent is extended or adjusted under 35 U.S.C. 154(b) by 139 days.

(21) Appl. No.: 18/505,981

(22) Filed: Nov. 9, 2023

(65) Prior Publication Data

US 2024/0156564 A1    May 16, 2024

Related U.S. Application Data

(60) Provisional application No. 63/424,273, filed on Nov. 10, 2022.

(51) Int. Cl.
| | | |
|---|---|---|
| *A61B 90/35* | (2016.01) | |
| *A61B 34/20* | (2016.01) | |
| *A61B 42/10* | (2016.01) | |
| *A61B 90/53* | (2016.01) | |
| *A61B 90/98* | (2016.01) | |
| *A61B 90/00* | (2016.01) | |
| *A61B 90/50* | (2016.01) | |

(52) U.S. Cl.
CPC .............. *A61B 90/35* (2016.02); *A61B 34/20* (2016.02); *A61B 42/10* (2016.02); *A61B 90/53* (2016.02); *A61B 90/98* (2016.02); *A61B 2034/2055* (2016.02); *A61B 2090/3937* (2016.02); *A61B 2090/502* (2016.02)

(58) Field of Classification Search
CPC ......... A61B 90/35; A61B 34/20; A61B 42/10; A61B 90/53; A61B 90/98; A61B 2034/2055; A61B 2090/3937; A61B 2090/502; A61B 2017/00203; A61B 2017/00438; A61B 2034/2051; A61B 2090/309; A61B 90/30
See application file for complete search history.

(56) References Cited

U.S. PATENT DOCUMENTS

| 7,370,991 B1 * | 5/2008 | Ellis-Fant | F21L 14/00 |
| | | | 362/276 |
| 11,413,110 B2 * | 8/2022 | Winslow | A61B 90/30 |

(Continued)

*Primary Examiner* — Evan P Dzierzynski
(74) *Attorney, Agent, or Firm* — Armis IP Law, LLC

(57) ABSTRACT

A surgical headlamp includes an illumination element movably disposed on a frame adapted for headband placement on a user, allowing an illumination LED to focus irradiation onto a surgical field. A positioning element engaged between the illumination element, and the frame allows rotational and pivotal movement of the illumination element relative to the frame. A tracking circuit receives a position signal from a field of view illuminated by the illumination element, such that positioning element is responsive to position the illumination element for directing the focus to a predetermined location within the field of view for consistently positioned illumination. The focus is defined by a marker in the field of view, which may be an RFID (Radio Frequency Identifier, an optical indicia or feature, or other designation of a predetermined location affixed to the hand or established on a surgical glove, instrument or similar fixture in the surgical field.

18 Claims, 5 Drawing Sheets

(56) References Cited

U.S. PATENT DOCUMENTS

| | | | |
|---|---|---|---|
| 2012/0259178 A1* | 10/2012 | Kim | A61B 42/10 |
| | | | 600/249 |
| 2012/0275140 A1* | 11/2012 | Feinbloom | F21L 14/00 |
| | | | 362/105 |
| 2015/0016094 A1* | 1/2015 | Yamai | F21V 23/0492 |
| | | | 362/105 |
| 2018/0296079 A1* | 10/2018 | Orringer | A61B 90/30 |

* cited by examiner

SURGICAL HEADLAMP

BACKGROUND

Precision work in confined spaces benefits from ample illumination of the work area. In a medical context, surgical procedures require illumination of the surgical region, combined with dexterity, for manual control of surgical instruments, probes, cutting devices, and the like. Spot illumination, such as a concentrated beam of light directed to a surgical site, is particularly beneficial.

SUMMARY

A surgical headlamp includes an illumination element movably disposed on a frame adapted for headband placement on a user, allowing the illumination element, typically an LED or array of LEDs, to focus irradiation onto a surgical field. A positioning element engaged between the illumination element, and the frame allows rotational and pivotal movement of the illumination element relative to the frame. A tracking circuit receives a position signal from a field of view illuminated by the illumination element, such that positioning element is responsive to position the illumination element for directing the focus to a predetermined location within the field of view for consistently positioned illumination. The focus is defined by a marker in the field of view, which may be an RFID (Radio Frequency Identifier, an optical indicia or feature, or other designation of a predetermined location that may be affixed to the hand or established on a surgical glove, instrument or similar fixture in the surgical field.

Configurations herein are based, in part, on the observation that medical environments in general, and in particular surgical and operating room facilities, benefit from amply lighting. Unfortunately, conventional approaches to operating room lighting suffer from the shortcoming that consistent, targeted light directed onto the surgical site (incision, wound or open field) may be intermittent, subjected to shadows from other equipment or fixtures, or unfixed and inconsistently illuminating the site. Accordingly, configurations herein substantially overcome the shortcomings of conventional Operating Room (OR) lighting by providing a headlamp or illumination element configured to focus on a marker or beacon in or adjacent to the surgical site, and mounted in an actuated frame for maintaining a focus on the beacon as the wearer's head is rotated or moved, continually directing a focus of the illumination element at the surgical site.

The marker defines a predetermined location by having recognized properties differentiable from a surrounding area or region. This predetermined location depicts an area of focus such as a surgical site, and may be movable, as in a surgeon's hand, digit or instrument. A locator includes a tracking circuit responsive to the marker, and is invoked to locate and follow the marker based on a sensing medium. The sensing medium may be an electromagnetic signal such as an RFID, an optical input such as a color, shape or light, sonic or Ultrasound (US), or similar stimuli to which the tracking circuit may locate.

The illumination element moves in a pan and tilt manner relative to the frame for directing the focus of the illumination element towards the marker independently of head-induced movement of the frame. In practical use, this means that the surgeon can turn their field of vision to an adjacent instrument display or monitor without removing the illumination from the surgical site. Similarly, head movement while viewing the surgical sight will allow the light to remain focused on the marker/surgical site. Conventional approaches with a fixed, head mounted lamp direct light only when the surgeon is facing the site, and move the light away from the surgical site if the surgeon turns to view a display or instrument readout, for example.

In a particular configuration, the positioning element is defined by a positioning member, actuator or array (typically 2), such that each actuator engages with the illumination element for rotational movement about an axis. Nested gimbal rings may be employed, and two axes of rotation therefore allows projection of the illumination focus around the surgical site and appurtenant operating area. Alternatively, a connected sequence of pivotal mounts may be employed.

An additional enhancement may provide a microphone connected to the positioning circuit, where the positioning circuit has a command list and is configured for matching an auditory signal from the microphone to the command list. A set of verbal commands is prearranged for directing the positioning element based on a matched command in the command list. Commands directing the light source to pan/move left or right, and up and down may be spoken and recognized. Subsequent commands may direct refocus on the beacon, i.e. back to the surgical site. Commands generally correspond to at least one of a movement instruction and an illumination instruction; additional commands may direct an illumination intensity of the illumination element based on the matched command, for dimming the illumination.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

The description and examples below illustrate an example deployment of the directional surgical light device in a patient healthcare environment such as an operating room. Other deployments may include medical or other tasks involving a degree of manual dexterity for illuminating the task area using a beacon or tracker in an activity region, as now described further below.

Figure 1:
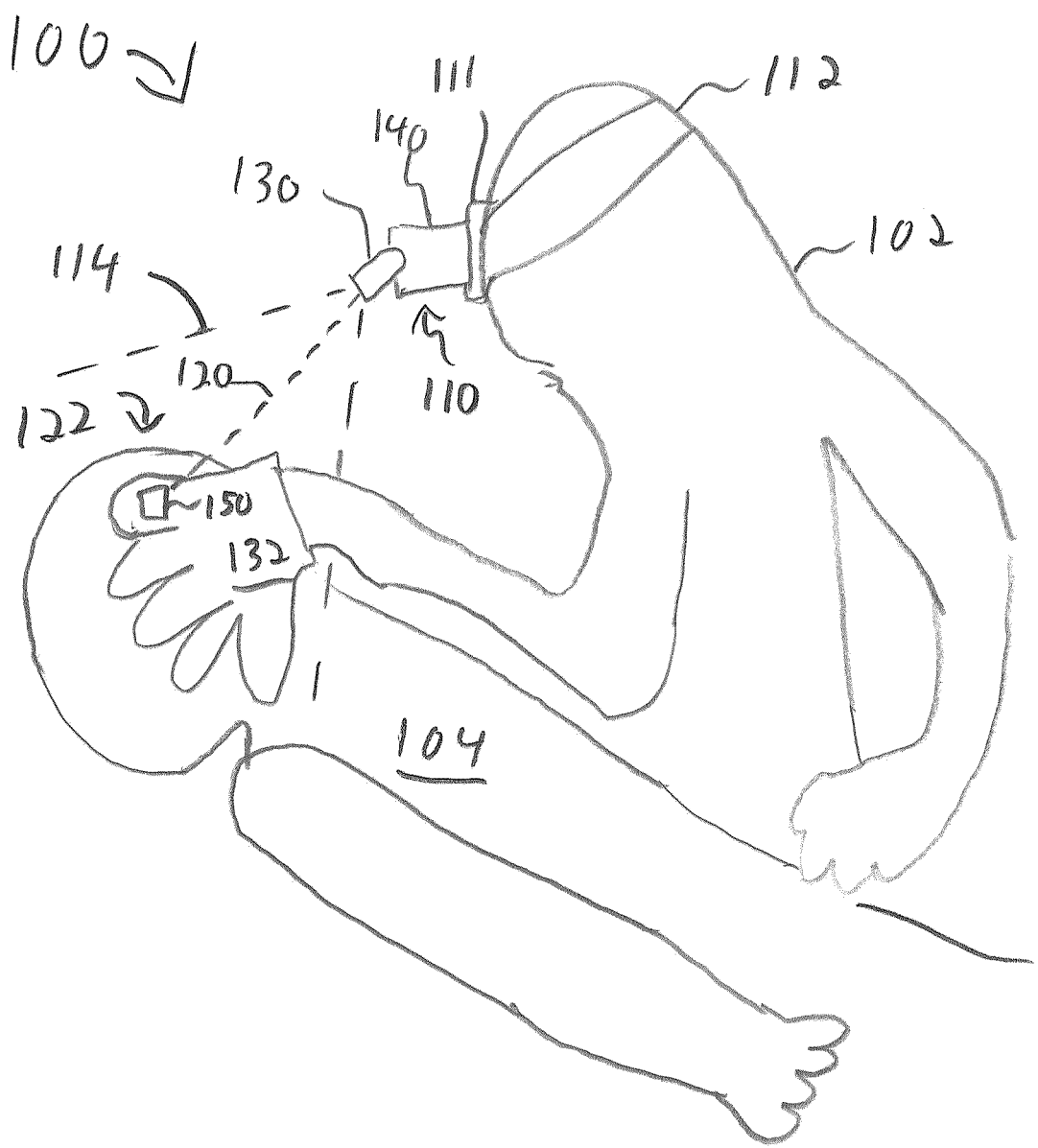
FIG. 1 is a context diagram of the directional surgical headlamp device employed in a medical procedure.

FIG. 1 is a context diagram of the directional surgical headlamp device employed in a medical procedure. In a medical environment 100, a doctor 102 or medical technician performs diagnostic or remedial procedures on a patient 104. This typically involves precision manual tasks performed by hand. The surgical headlamp device 110 includes an illumination element 130 (LED) deployed on a frame 111 attached to a headband 112 for focusing a light beam 114 centered around a focus 120 aimed at a surgical site 122.

The beam 114 remains directed towards the surgical site 122 by following a marker 150 attached to a glove 132, surgical instrument or other fixture in the surgical site 122. The device 110 includes a positioning element 140 for aiming the illumination element 130 at the surgical site by maintaining the focus 120 on the marker, and maintaining the focus when the headband 112 moves, perhaps to view diagnostic or monitor feedback, so that the illumination element 130 maintains the focus 120 on the surgical site 122 as the headband/head returns to view the site.

Figure 2:
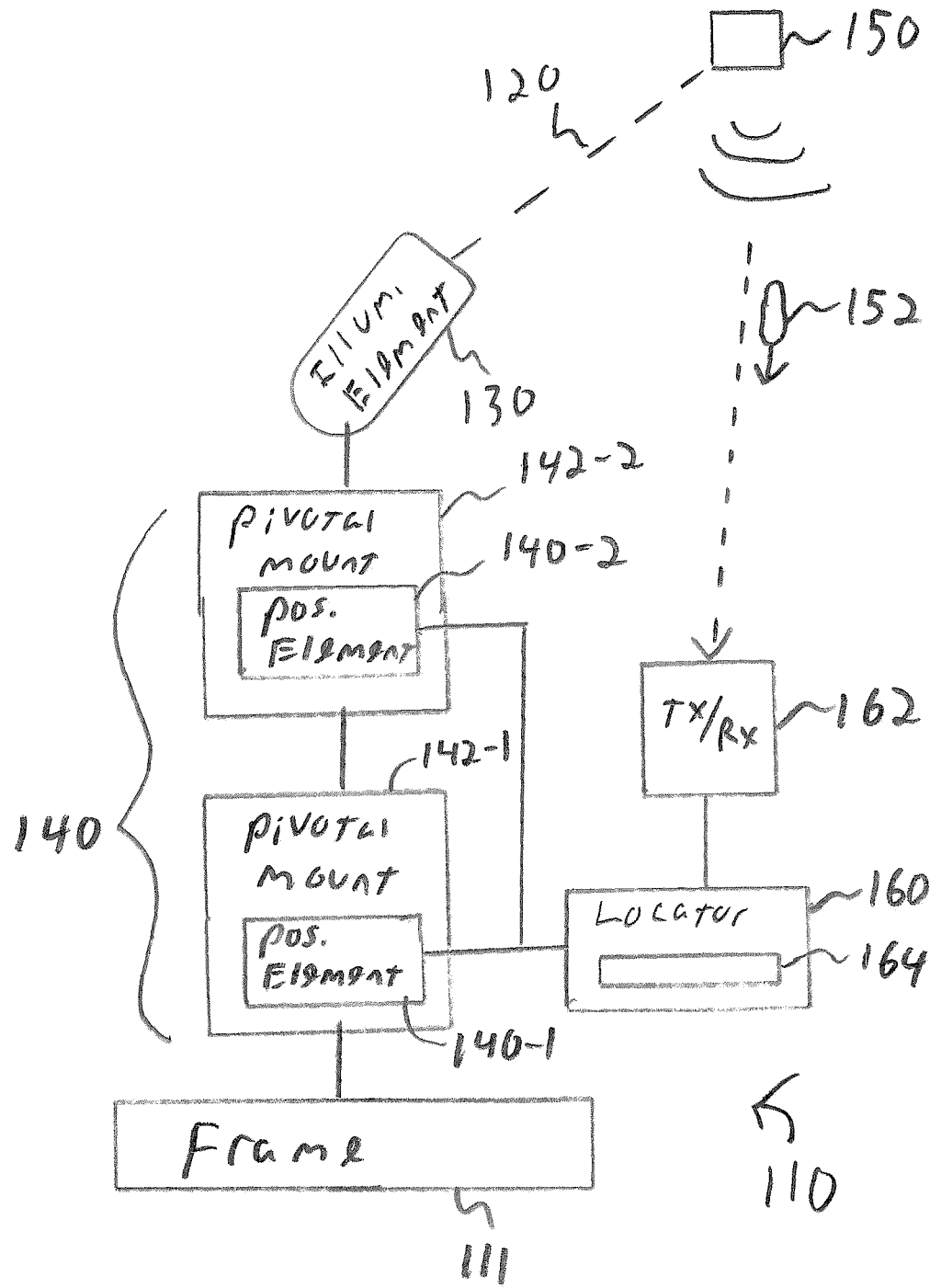
FIG. 2 is a block diagram of a circuit and system for providing the directional surgical headlamp device of FIG. 1.

FIG. 2 is a block diagram of a system and circuit for providing the directional surgical light of FIG. 1. Referring to FIGS. 1 and 2, the surgical headlamp device 110 includes a frame 111 having a pivotal mount 140, where the frame 111 is disposed on a flexible headband 112 adapted for placement on a user or patient 104. The illumination element 130 is disposed on the pivotal mount and has a focus 120 defining a direction of irradiation from the illumination element. A positioning element 140 is engaged between the illumination element 130 and the frame 111 for directing movement of the pivotal mount for aiming the illumination element 130. The positioning element 140 is responsive to a locator 160 for aligning the focus 120 with the marker 150. In an example configuration, the positioning element may include a plurality of positioning elements 140-1..140-2 (140 generally), such as along each axis, and each driving or actuating a respective pivotal mount 142-1..142-2 (142 generally) guiding the illumination element 130, discussed further below. A receiver 162 is disposed for receiving position signals 152 from the marker 150, where the locator 160 is responsive to the receiver 162 for disposing (moving) the pivotal mounts 142 based on the position signals 152.

A tracking circuit 164 in the locator implements positioning logic in the locator 160 for directing the positioning element 140 to align the focus 120 of the illumination element 130 with the marker 150. The receiver 162 may include an RFID (Radio Frequency Identification) reader and antenna operable to receive the position signals 152 from the marker 150 defined by an RFID tag disposed in a focal range of the illumination element 130. The position signals 152 may also be an optical reflection or vision based indicia received by a camera. In such a configuration the indicia defines the marker 150 and is typically a discrete and contrasting color tag, patch or similar indicia affixed in the surgical field. The receiver 162 is generally operable in a wireless medium and the marker 150 is operable for transmitting or reflecting signals in the wireless medium indicative of a position of the marker.

Figure 3A:
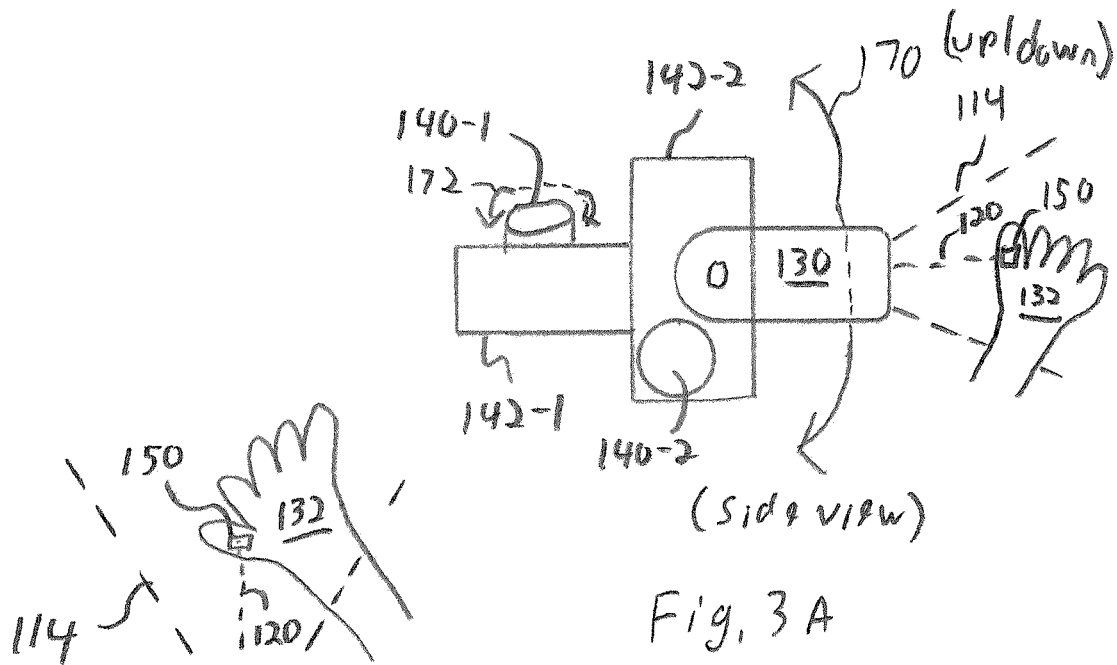
FIGS. 3A and 3B show side and plan views of the directional surgical headlamp device of FIGS. 1 and 2 depicting respective axes of movement.
Figure 3B:
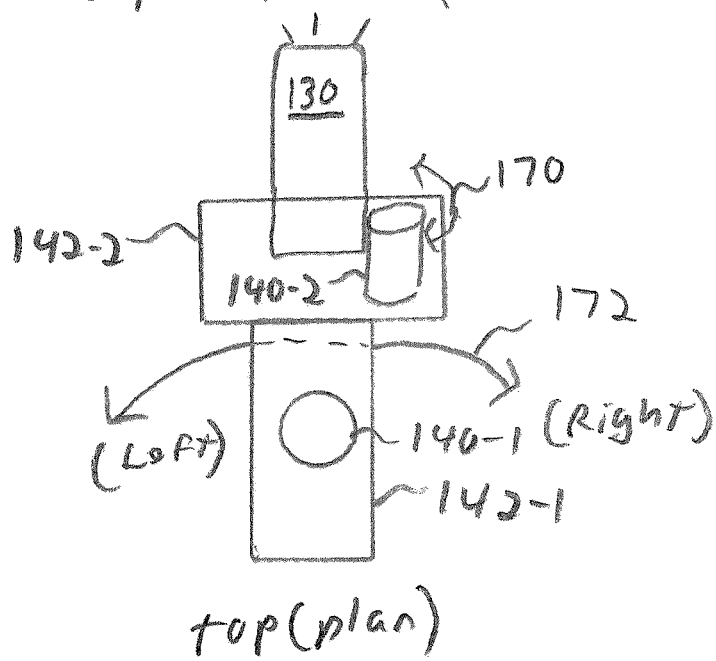

FIGS. 3A and 3B show side and top (plan) schematic views of the surgical headlamp of FIGS. 1 and 2 depicting respective axes of movement. Referring to FIGS. 1-3B, the positioning element 140 includes a plurality of servo motors, such that each servo motor is responsive to the locator 160 for pivoting the illumination element 130 around a respective axis. Generally, two axes are considered, where the positioning element 140 is configured to direct the illumination element 130 along a tilt 170 for aiming the focus 120 in a vertical component, and along a pan angle 172 for aiming the focus 120 in a horizontal component (left/right). A third axis for zooming is generally not needed due to the close proximity of the surgical region and the reach of a beam from the illumination element, however could of course be considered in alternate configurations.

Therefore, in the schematic examples shown, the pivotal mount includes a first pivotal mount 142-1 configured to pivot around a first axis, for panning around a vertical axis, and a second pivotal mount 142-2 configured to pivot around a second axis, for tilting about a horizontal axis, where the first axis is orthogonal to the second axis. A serial linkage between the first pivotal mount 142-1 and the second pivotal mount 142-2 assures a combined multi- or aggregate axis positioning for attaining the focus 120, as the second pivotal mount attaches to, and pans laterally with, the first pivotal mount. It should be apparent that each pivotal mount 142 includes a respective positioning element 140, in this case a servo motor, each responsive to the locator 160. Alternate positioning elements such as linear actuators or other rotational motors may be employed.

Figure 4A:
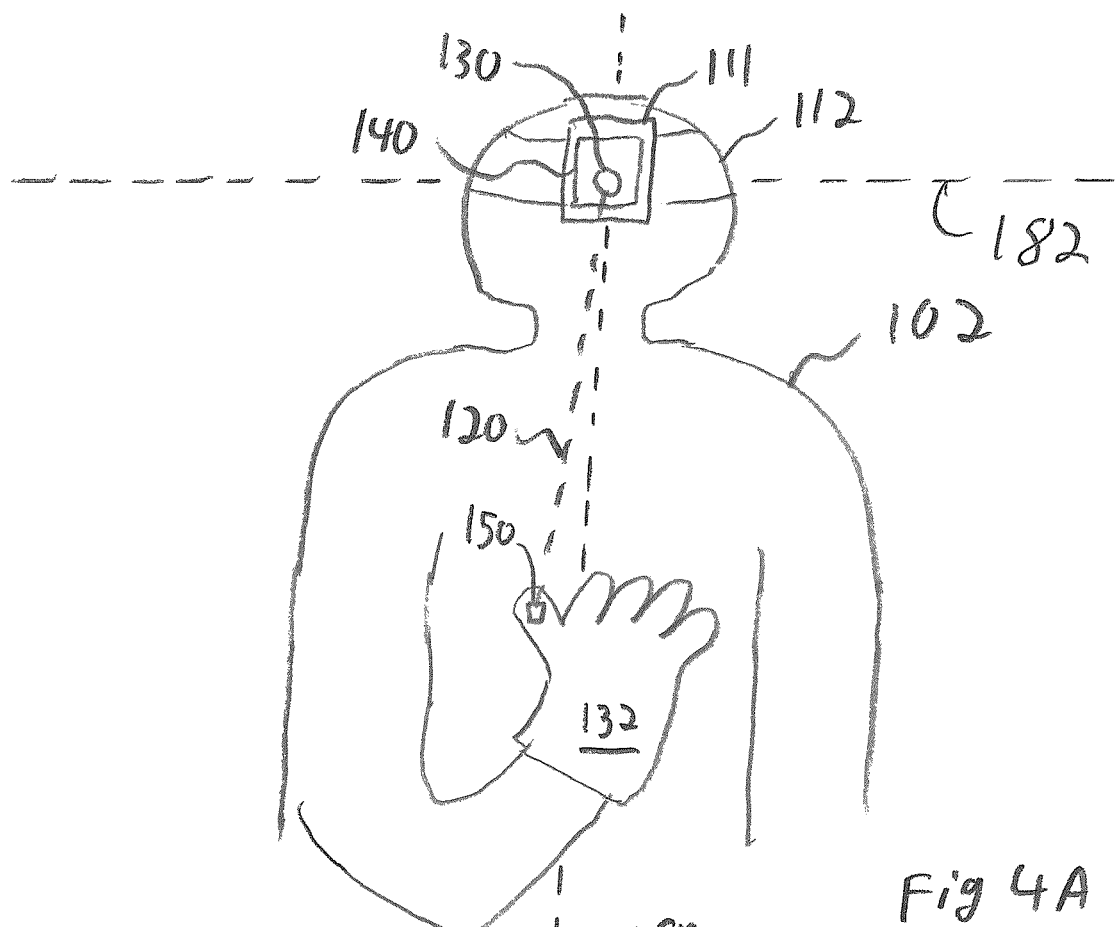
FIGS. 4A and 4B show front and side profiles of a user engaged with the directional surgical headlamp device of FIGS. 1-3B.
Figure 4B:
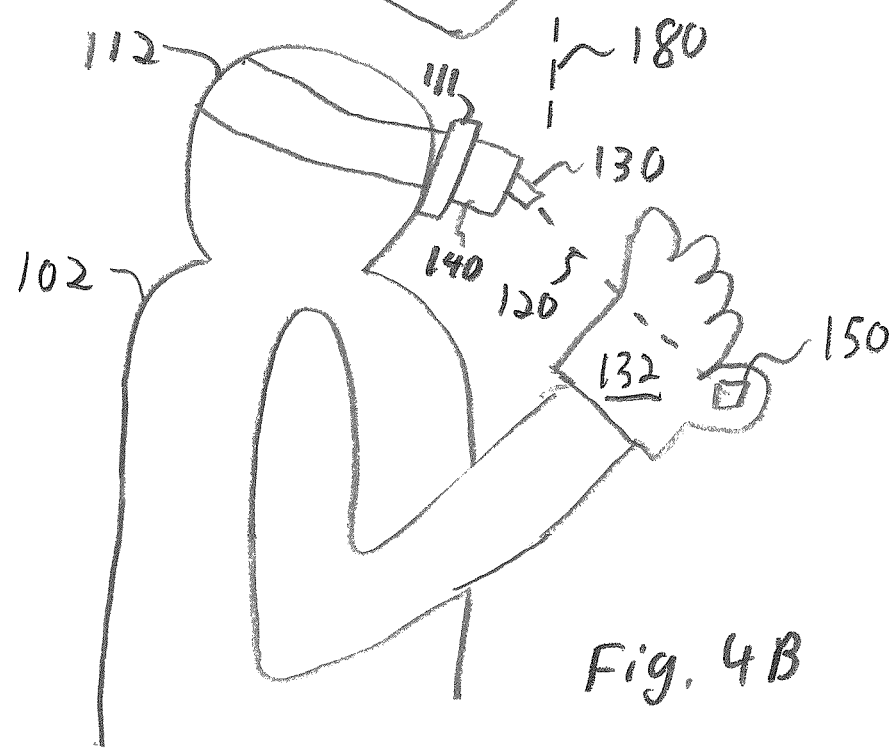

FIGS. 4A and 4B show front and side profiles of a user engaged with the directional surgical light of FIGS. 1-3B. Referring to FIGS. 1-4B, the first pivotal mount 142-1 is rotatable around a vertical axis 180 for adjusting the focus 120 according to a horizontal component, or pan angle 172 of the marker 150 position. The second pivotal mount 142-2 is engaged with the first pivotal mount 142-1 for adjustment of the vertical component, or tilt 170, and is rotatable around a horizontal axis 182 for adjusting the focus 120 according to aligning a vertical component of the marker 150 position.

Upon this framework, the receiver 162 receives the position signals 152 indicative of a direction of the marker 150, and the locator 160 is operable for computing the vertical component and the horizontal component for aligning the focus 120 on an intersecting path with the marker 150. The locator 160 may be a suitable processor based device, with I/O (Input/Output) ports for the positioning elements 140/servos, such as an Arduino® or Raspberry PI®. Other suitably compact processing devices may also be employed. The locator 160 is configured to compute a horizontal component and a vertical component based on the position signals 152, where the horizontal component and the vertical component define a respective degree of pivot for aligning the focus 120 with the marker 150. The tracking circuit 164 may include a set of programmed instructions for computing the position of the marker 150 based on the position signals 152 and for directing the servos at the appropriate computed horizontal and vertical angles via the I/O ports.

In order to maintain the focus 120 within the surgical field, the marker 150 is adapted for engagement with a surgical glove, instrument or other object deployed in the surgical field. For example, in one configuration the marker 150 is an RFID attached, glued, fused or otherwise engaged with a surgical glove 132, perhaps on the index finger to assure a focus 120 aligned with the surgical activity. Alternatively, the marker could be attached to a surgical instrument.

Figure 5A:
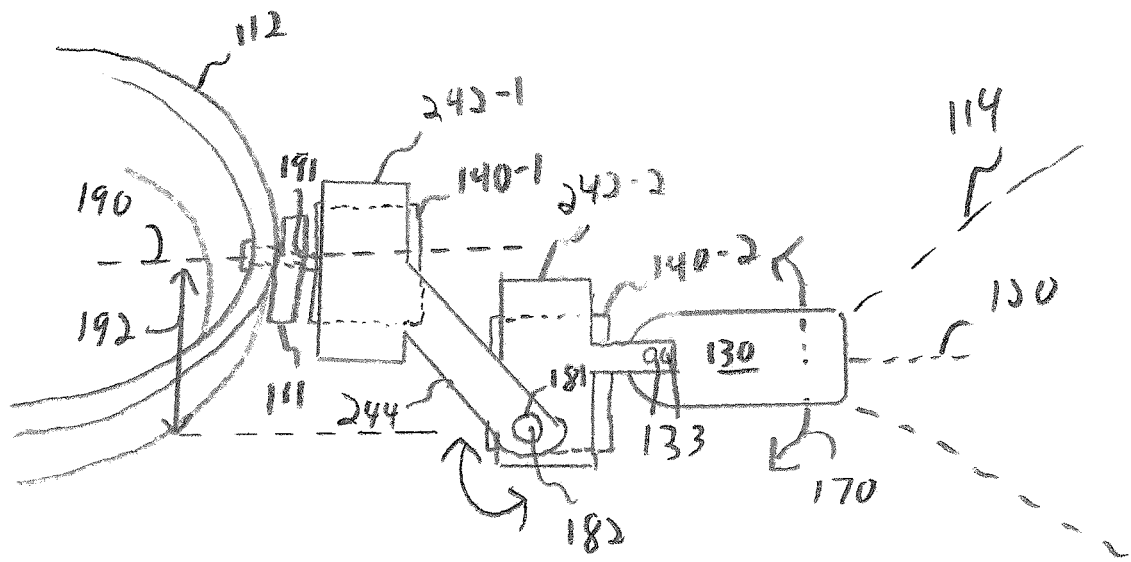
FIGS. 5A-5B show an alternate configuration employing a pivotal bracket arrangement.
Figure 5B:
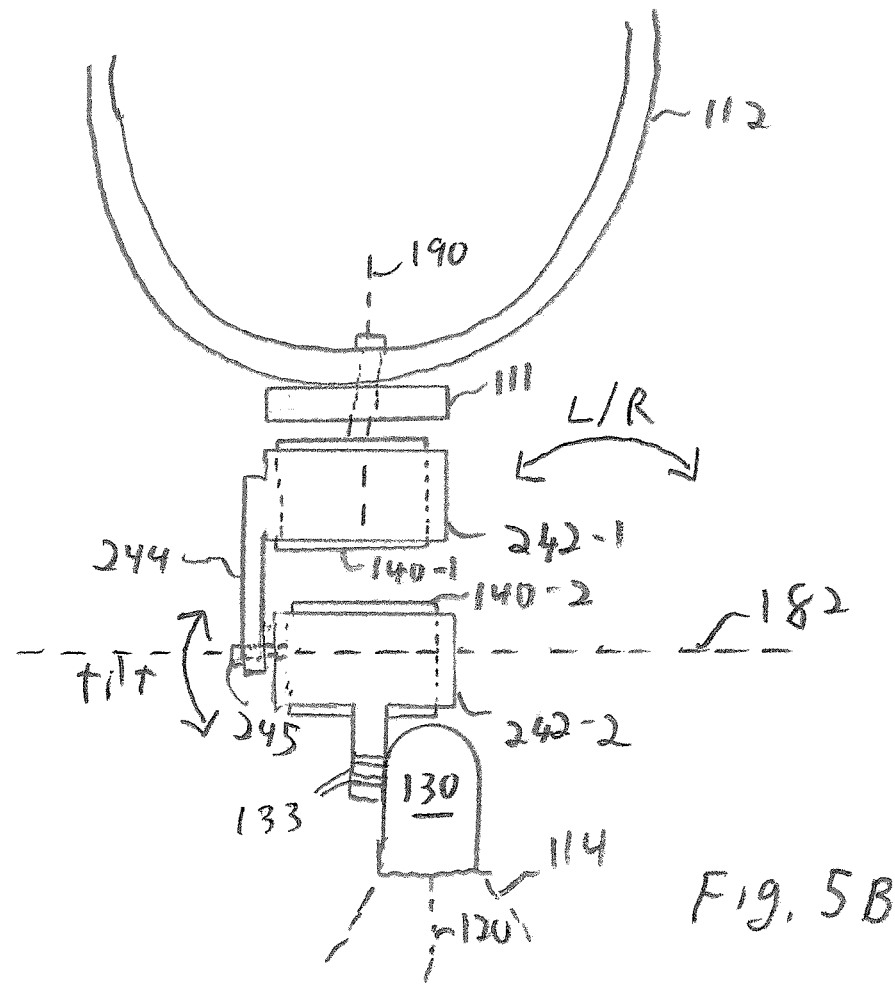

FIGS. 5A-5B show an alternate configuration employing a pivotal bracket arrangement. Referring to FIGS. 1-5B, the positioning element 140 may be deployed in a series of brackets 242-1..242-2 (242 generally). Each bracket is oriented around a different axis, typically perpendicular to each other. The frame 111 engages with the headband via screws or other fastener. Bracket 242-1 retains the positioning element 140-1, such as a servo motor. The positioning element 140-1 has a rotational engagement 191 with the frame 111 for rotation around axis 191. In an example arrangement, a spline fixation with the frame 111 and/or headband affixes the frame 111 to the headband 112 while the bracket 242-1 rotates for providing lateral (left/right) orientation of the illumination element 130.

The pair of brackets 242-N operate in tandem for pivotal movement of the illumination element 130. An offset member 244 pivotally attaches bracket 242-2 to bracket 241. The offset member 244 extends the bracket 242-2 for rotational clearance about axis 182 for implementing the forward and backward tilt 170 of the illumination element 130. The offset 192 of the pivotal attachment 245 extends the rotational radius provided by the bracket 242-1, effectively translating rotation around axis 190 (parallel to a forward facing orientation of the wearer) into left and right lateral focusing range of the illumination element 130.

The positioning element 140-2 is retained within the bracket 242-2 and drives a shaft defining the rotational engagement 145, such as a servo motor. The illumination element 130 is attached to bracket 242-2 via fasteners 133. As both brackets 242 pivot or rotate along perpendicular axes, the focus 120 follows the marker 150.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A surgical headlamp device, comprising:
    a frame having a pivotal mount, the pivotal mount further comprising:
        a first pivotal mount configured to pivot around a first axis;
        a second pivotal mount configured to pivot around a second axis, the first axis orthogonal to the second axis; and
        a serial linkage between the first pivotal mount and the second pivotal mount;
    the frame disposed on a flexible headband adapted for placement on a user;
        an illumination element disposed on the pivotal mount, the illumination element having a focus defining a direction of irradiation from the illumination element;
        a positioning element engaged between the illumination element and the frame, the positioning element directing movement of the pivotal mount for aiming the illumination element, the positioning element responsive to a locator for aligning the focus with a marker, the positioning element further comprising:
            a first bracket housing a first positioning element;
            a second bracket housing a second positioning element;
            the second bracket pivotally mounted to the first bracket;
            the first bracket pivotally mounted to the frame; and
            the illumination element attached to the second bracket for aiming the focus based on an aggregation of rotation of the first positioning second element and the second positioning element; and
        a receiver for receiving position signals from the marker, the locator responsive to the receiver for disposing the pivotal mount based on the position signals.

2. The device of claim 1 wherein the positioning element includes a plurality of servo motors, each servo motor responsive to the locator for pivoting the illumination element around a respective axis.

3. The device of claim 1 wherein the positioning element is configured to direct the illumination element along a tilt for aiming the focus in a vertical component, and along a pan for aiming the focus in a horizontal component.

4. The device of claim 3 wherein the receiver receives position signals indicative of a direction of the marker, the locator operable for computing the vertical component and the horizontal component for aligning the focus on an intersecting path with the marker.

5. The device of claim 4 wherein the marker is adapted for engagement with a surgical glove.

6. The device of claim 1 wherein the receiver includes an RFID (Radio Frequency Identification) reader and antenna, and is operable to receive the position signals from the marker, the marker defined by an RFID tag disposed in a focal range of the illumination element.

7. The device of claim 1 wherein the receiver is a camera and the marker is a predetermined visual indicia.

8. The device of claim 1 wherein the receiver is operable in a wireless medium and the marker is operable for transmitting or reflecting signals in the wireless medium indicative of a position of the marker.

9. The device of claim 1 wherein each pivotal mount includes a respective positioning element, each positioning element responsive to the locator.

10. The device of claim 9 wherein the first pivotal mount is rotatable around a vertical axis for adjusting the focus according to a horizontal component of a marker position; the second pivotal mount is engaged with the first pivotal mount for adjustment of the horizontal component, and is rotatable around a horizontal axis for adjusting the focus according to aligning a vertical component of a marker position.

11. The device of claim 1 wherein the locator is configured to compute a horizontal component and a vertical component based on the position signals, the horizontal component and the vertical component defining a respective degree of pivot for aligning the focus with the marker.

12. The device of claim 1 further comprising an offset member between the first bracket and the second bracket, the offset member radially translating the rotation of the first bracket into lateral positioning of the second bracket.

13. A method for illuminating a surgical field, comprising:
    receiving a position signal from a marker disposed in a surgical field;
    engaging an illumination source with a pivotal mount, the pivotal mount further comprising:
        a first pivotal mount configured to pivot around a first axis;

a second pivotal mount configured to pivot around a second axis, the first axis orthogonal to the second axis; and a serial linkage between the first pivotal mount and the second pivotal mount;

the illumination source adapted to achieve a focus towards the surgical field;

directing movement of the pivotal mount via a positioning element for aiming the illumination element based on the position signals, the positioning element further comprising:

a first bracket housing a first positioning element;

a second bracket housing a second positioning element;

the second bracket pivotally mounted to the first bracket;

the first bracket pivotally mounted to the frame; and the illumination element attached to the second bracket for aiming the focus based on an aggregation of rotation of the first positioning second element and the second positioning element; and aiming the illumination element for aligning a focus of the illumination element with the marker.

14. The method of claim 13 further comprising:

receiving a second position signal from the marker; and repositioning the illumination source to realign the focus with the marker by directing movement of the pivotal mount based on the second position signal.

15. The method of claim 13 further comprising:

attaching the illumination element to a frame on a headband; and aiming the illumination element to align the focus independently of movement of the headband.

16. The method of claim 13 further comprising:

transmitting the position signals from an RFID (Radio Frequency Identifier) in the marker to a receiver; and receiving the position signals at the receiver, the receiver in communication with a positioning element coupled to the pivotal mount.

17. A computer program embodying program code on a non-transitory computer readable medium that, when executed by a processor, performs steps for implementing a method for moving an illuminating element over surgical field, the method comprising:

receiving a position signal from a marker disposed in a surgical field;

engaging an illumination source with a pivotal mount, the pivotal mount further comprising:

a first pivotal mount configured to pivot around a first axis;

a second pivotal mount configured to pivot around a second axis, the first axis orthogonal to the second axis; and a serial linkage between the first pivotal mount and the second pivotal mount;

the illumination source adapted to achieve a focus towards the surgical field;

directing movement of the pivotal mount via a positioning element for aiming the illumination element based on the position signals. the positioning element further comprising:

a first bracket housing a first positioning element;

a second bracket housing a second positioning element;

the second bracket pivotally mounted to the first bracket;

the first bracket pivotally mounted to the frame; and the illumination element attached to the second bracket for aiming the focus based on an aggregation of rotation of the first positioning second element and the second positioning element; and aiming the illumination element for aligning a focus of the illumination element with the marker.

18. The computer program of claim 17, further comprising rotating an offset member for radial translation of the illumination source resulting from rotation of the pivotal mount.

* * * * *